(12) United States Patent
Yamagata et al.

(10) Patent No.: US 7,150,859 B2
(45) Date of Patent: Dec. 19, 2006

(54) MICROARRAY FABRICATING DEVICE (75) Inventors: Yutaka Yamagata, Wako (JP); Kozo Inoue, Shibuya-ku (JP)

(73) Assignees: Riken, Wako (JP); Fuence Co., Ltd., Tokyo (JP)

( * ) Notice: Subject to any disclaimer, the term of this patent is extended or adjusted under 35 U.S.C. 154(b) by 692 days.

(21) Appl. No.: 09/980,099

(22) PCT Filed: Apr. 2, 2001

(86) PCT No.: PCT/JP01/02868

§ 371 (c)(1),
(2), (4) Date: Apr. 18, 2002

(87) PCT Pub. No.: WO01/75442

PCT Pub. Date: Oct. 11, 2001

(65) Prior Publication Data

US 2002/0136821 A1    Sep. 26, 2002

(30) Foreign Application Priority Data

Apr. 3, 2000  (JP) .............................. 2000-100395

(51) Int. Cl.
*B01L 3/02* (2006.01)
(52) U.S. Cl. ........................ 422/100; 422/50; 422/68.1; 422/99; 436/86; 204/164; 204/485; 204/193; 204/298.11
(58) Field of Classification Search .......... 422/99–100, 422/50, 68.1; 436/86; 204/164, 485, 298.11
See application file for complete search history.

(56) References Cited

FOREIGN PATENT DOCUMENTS

| JP | A 10-503841 | 4/1998 |
|---|---|---|
| JP | A 11-187900 | 7/1999 |
| WO | WO 98/58745 | * 12/1998 |

OTHER PUBLICATIONS

Victor N. Morozov et al.; "Electrospray Deposition as a Method for Mass Fabrication of Mono- and Multicomponent Microarrays of Biological and Biologically Active Substances"; Analytical Chemistry; pp. 3110-3117, vol. 71; 1999.
Victor N. Morozov et al.; "Electrospray Deposition as a Method To Fabricate Functionally Active Protein Films"; Analytical Chemistry; pp. 1415-1420, vol. 71; 1999.

* cited by examiner

*Primary Examiner*—Jill Warden
*Assistant Examiner*—Jyoti Nagpaul
(74) *Attorney, Agent, or Firm*—Oliff & Berridge, PLC

(57) ABSTRACT

A device for fabricating a high-density microarray for cDNA or protein having an arbitrary pattern comprises an electrospray part for electrostatically spraying solutions containing a plurality of kinds of biologically active samples one by one, a support part supporting sample chips on which samples in the solutions sprayed from the electrospray part are deposited, a mask part disposed between the electrospray part and the support part and having holes the number of which is the same as that of the sample chips so as to selectively deposit the samples simultaneously in the adequate positions corresponding to the sample chips, a moving part for fabricating microarrays at a time by relatively moving the sample chip support part and the mask part and depositing the samples on the sample chips. Therefore the device can fabricate a large number of inexpensive high-density microarrays.

17 Claims, 9 Drawing Sheets

TO HIGH VOLTAGE POWER SUPPLY FOR ELECTROSPRAYING

025 # MICROARRAY FABRICATING DEVICE

FIELD OF THE INVENTION

The present invention relates to a device (Microarrayer) for manufacturing microarrays (such as DNA chips, protein chips and organic compound chips, etc.).

BACKGROUND ART

A genome of kinds of bacteria and yeast (i.e. base sequence of the entire genes) has been determined in late years, and a human genome would be determined completely in the near future. Such a rapid progress of the genome sequencing technology makes it possible to clarify functions of the determined genes and functions of proteins derived from the determined genes. It is said that the number of genes of yeast is approximately 6,200 and the number of genes of human being is approximately 100,000. Thus, a technology for manipulating at the same time a vast number of genes such as proteins and others is needed for making clear these functions. The microarray technology has been rapidly developed in these years for accomplishing the above object and has attracted great attentions. The object of this technology is to achieve experimental systems for synthesizing a number of oligonucleotides on substrates such as slide glasses and for immobilizing cDNAs or proteins. For example, there has been developed an experimental system, in which a large number spot of cDNAs of all genes (genome) are disposed on one piece of slide glass, these spots are hybridized, and an intensity of the hybridization of respective spots is measured to determine expressions of respective genes.

For instance, U.S. Pat. No. 5,445,934 discloses a DNA chip including synthesized oligonucleotide on a substrate at a rate of not less than 1,000 spots/cm$^2$. Furthermore, "Nature Genetic Supplements", Vol. 21 (Patrick O. Brown et al. p33–37; David D. L. Bowtell p25–32, 1999, January) discloses a method for spotting cDNA solutions on a slide glass using a pin. Also, U.S. Pat. No. 5,807,522 discloses a method for spotting cDNA solutions on a slide glass using a solenoid vibrating the solutions.

There have been proposed the following methods of manufacturing microarrays:
(1) Photo-lithography method
(2) Micro spotting method
(3) Ink-jet method.

In the method (1), oligonucleotides are synthesized on a substrate using the same photo-lithography technology as that employed for manufacturing a semiconductor device. In the method (2), solutions of cDNAs and the like are spotted on a substrate using a pin-like tool. In the method (3), solutions of cDNAs, etc. are dropped from a narrow nozzle using a piezoelectric transducer and so on.

According to the method (1), successive spots can be placed at an interval of about 50–25 μm to manufacture a microarray having a high spot density. However, in this method, since an oligonucleotide is synthesized on the substrate, this method could not be applied to cDNAs which have been prepared separately. In addition, it takes a long time to design and manufacture a photomask, and thus this method is very expensive. In the methods (2) and (3), while these methods can be applied to cDNAs which have been prepared separately, a diameter of resulting spots is relatively large such as approximately 300–150 μm, and therefore, it is hard to manufacture a microarray with a high spot density. Owing to the reason that these methods require mechanically operation, they are suitable for manufacturing chips in small quantity, but are not suited for manufacturing chips in mass production. According to a document (Vivian G. Cheung et al. "Nature Genetic Supplements" 1999, January), if a size of a spot is reduced from 200 μm to 50 μm, a quantity of sample needed for making a chip goes down to about 1/100. Thus, upon realizing a practical microarray, one of critical problems to be solved is that how to reduce a spot size in order to obtain a chip with a high spot density.

In order to make clear functions of various genes or proteins and to use these findings in researching new drugs, diagnosing diseases and selecting optimal drugs for individual persons and so on, a microarray containing cDNAs or proteins must be manufactured with a small spot size and a high spot density at low cost. Therefore, the present invention is to provide a device for manufacturing a high spot density microarray having a spot size (i.e. diameter) of several μm to several tens μm by using one or more samples which have been prepared separately.

In PCT international publication WO98/58,745 and a document "Analytical Chemistry", Vol. 71' (Morozov et al. pp. 1415–1420, pp. 3110–3117, 1999)', there have been proposed a device and a method for making solid spots or a film on a substrate by using the electrostatic spray, while the biologically activities of biomolecules such as a nucleic acid or a protein has are retained. A method and a device for manufacturing a microarray with very small spots simultaneously by adjusting various conditions have been also disclosed. However, since these method and device use a filter in the form of mesh, they could not provide a microarray, in which various samples are located at desired positions.

SUMMARY OF THE INVENTION

The present invention has for its object to provide a device for manufacturing a high spot density microarray, in which one or more cDNAs or proteins are arranged in accordance with an arbitrarily pattern by developing the above mentioned knowledge. According to the invention, a device for manufacturing microarrays comprises:

electro-spraying means for electrostatically spraying, in sequence, a plurality of solutions each containing respective one of a plurality of kinds of biologically active samples;

supporting means for supporting a plurality of sample chips on which samples contained in the solutions and electrostatically sprayed from said electro-spraying means are deposited;

masking means disposed between said electro-spraying means and said supporting means and having holes whose number is equal to the number of the sample chips, a sample being selectively and simultaneously deposited on said sample chips at predetermined corresponding locations; and shifting means for shifting relatively said supporting means and said masking means such that the samples are deposited on said plurality of sample chips to manufacture simultaneously a plurality of microarrays. Upon using the device for manufacturing microarrays according to present invention, a capillary provided in the electro-spraying means is moved to a center of an electro-spraying region and is connected to a high voltage power source, and then the method disclosed in said patent publication and document (WO98/58,745 and "Analytical Chemistry Vol. 71") is carried out to perform the electrostatic spray.

In a first embodiment of the device for manufacturing microarrays according to the invention, said electro-spraying means comprises a single capillary including one or more electrodes and liquid supplying means for feeding said plurality of solutions to said single capillary in sequence, each of said solutions containing respective one of said plurality of samples. According to need, the device may further comprise cleaning means for washing the capillary after a solution is electrostatically sprayed and before a next solutions is to be sprayed.

In a second embodiment of the device for manufacturing microarrays according to the invention, said electro-spraying means further comprises holding means for holding a plurality of multi-capillary cassettes each of which includes a plurality of capillaries each having one or more electrodes which are selectively connected with a power source for electro-spraying; and conveying means for conveying successively said plurality of multi-capillary cassettes to an electro-spraying location. In both of the first and the second embodiments of the microarray manufacturing device, said electro-spraying means may further comprise pressurized air supplying means for supplying a pressurized air to a single capillary or all of the capillaries in said multi-capillary cassettes simultaneously to convey the solution to a tip of the capillary or tips of all capillaries upon the electro-spraying. Furthermore, in both of the first and second embodiments of the microarray manufacturing device, the device may comprise driving means for moving the single capillary or the multi-capillary cassette upon the electro-spraying.

In order to assist the electro-spraying, the device may comprise pressurized air supplying means for supplying simultaneously a pressurized air to all the capillaries in said multi-capillary cassettes to convey the solution to tip of the all capillaries when the solution is electrostatically sprayed by the electro-spraying means. Moreover, said holding means for holding a plurality of multi-capillary cassettes may includes means for controlling temperature of a plurality of solutions contained in the capillaries in the multi-capillary cassettes (for example cooling them). According to this arrangement, the biological activities or biological functions of samples can be kept much more effectively.

DETAILED DESCRIPTION OF PREFERRED EMBODIMENTS

First Embodiment

A first embodiment of the device for manufacturing microarrays according to the present invention constructed as a single capillary system will be described. As shown FIG. 1, the single capillary system comprises a single capillary 11. The system is mainly consisting of an electro-spraying part 10, a masking part 20 and a supporting part 30 for supporting a substrate. In the device for manufacturing microarrays of the present embodiment, a plurality of the solutions containing respective biological active samples are electrostatically sprayed and are deposited on desired positions in depositing areas of substrates by means of a mask. This system comprises the capillary 11 including an electrode, the electro-spraying part 10 including a guard ring 12 and a shield 13, the masking part 20 including a mask 21 and a mask holder 22, and the movable substrate supporting part 30 including a plurality of sample chips 31 and a sample chip holder 32. That is, the device for manufacturing microarrays according to the invention comprises electro-spraying means for electrostatically spraying, in sequence, a plurality of solutions each containing respective one of a plurality of kinds of biologically active samples; supporting means for supporting a plurality of sample chips 31 on which samples contained in the solutions and electrostatically sprayed from said electro-spraying means are deposited; masking means disposed between said electro-spraying means and said supporting means and having holes whose number is equal to the number of the sample chips 31, a sample being selectively and simultaneously deposited on said sample chips at predetermined corresponding locations; and shifting means for shifting relatively said supporting means and said masking means such that the samples are deposited on said plurality of sample chips to manufacture simultaneously a plurality of microarrays.

The capillary 11 (made of glass, plastics, etc.) may contain solutions including cDNA, proteins, etc., and has the electrode provided therein. The capillary 11 is configured to apply a voltage to the solution via the electrode and a pressurized air is supplied to the capillary from its top when required. In case of spraying many kinds of cDNAs, proteins and the like, capillaries can be selectively mounted by using a capillary changer (not shown in FIG. 1) or manually. Alternatively, in order to prevent contamination, the capillary 11 may be washed by pure water and the like each time solutions are changed during the electro-spraying. The device may comprise means for moving one or more capillaries during the electro-spraying (not shown in FIG. 1). By moving the capillary during the electro-spraying, a sample can be sprayed over a wider area in one-spray, that is a samples can be spread over a larger number of sample chips in one-shot. Said moving means may be constructed such that the capillary is shifted or the sample holder and/or mask may be shifted. That is to say, the moving means may be constructed to move the capillary and the sample chips relatively. The guard ring 12 serves as an electrode for preventing diffusion of sprayed particles (i.e. solution) and is made of an electrically conductive material. An ES (Electro-Sprayer) is fully covered with a casing 14 such that the entire electro-spraying part can be protected from an influence of moisture and air turbulence. The shield 13 made of an electrically insulating material or a dielectric material (such as glass and plastics) and functions to spread sprayed particles uniformly.

The casing 14 has a dry air inlet 15 for supplying a clean and dry gas such as a dry air to accelerate a drying speed of sprayed particles and to suppress contamination by ambient atmosphere. The sample chip holder 32 supports a plurality of sample chips 31 (i.e. microarrays) such that the sample chips 31 are fixed by evacuation or electrostatic attraction to keep a right position relative to the mask 21. The sample chip holder 32 is precisely disposed in parallel with the mask 21 to keep a distance (a gap) between the holder 32 and the mask 21 constant. An X-Y stage 33 is controlled such that the holder 32 is driven over an X-Y plane to vary a relative position between the chips 31 and the mask 21 to form spots of samples at desired positions.

A Second Embodiment

A second embodiment of the device for manufacturing microarrays according to present invention constituted as the multi-capillary system will be described. As shown FIG. 2, the multi-capillary system uses multi-capillary cassettes each having a plurality of capillaries 51 and is suitable to spray more kinds of cDNAs or proteins effectively than the above explained single capillary system, while different kinds of solutions can be electrostatically sprayed without cross contamination by automatically changing the capillaries 51. A plurality of capillaries 51 are held in a cassette 52, and each cassette comprises a connector 53 connected to electrodes provided in respective capillaries 51 via electrical wiring and a gas supply channel for applying pressure. By using these components, an ESD (Electrostatic Spray Device) electric unit 54 (high voltage generating and switching) connected to the connector 53 through a cable 55 applies a high voltage to the capillaries 51 selectively to select samples to be electrostatically sprayed rapidly and many kinds of spots can be deposited rapidly.

When a multi-capillary cassette 52 is mounted, electrodes provided in capillaries within the cassette can be connected to the high voltage power supply source 54 via the connector 53 and cable 55. The ESD unit 54 generates a high voltage required for electro-spraying and changes the application of the high voltage to capillaries to alter substances to be electrostatically sprayed. In addition to the high voltage (about 2000–4000 V) to be provided to solutions to be electrostatically sprayed, the ESD unit 54 also provides high voltages (about 500–3000 V) applied to a guard ring and a collimating ring (not shown FIG. 2).

The case 56 protects an electro-spraying process from disturbance like as the single capillary system. A large-scaled shield 57 is formed by a mesh of an insulating material or a dielectric material and ensures uniform distribution of the electrostatically prayed particles. An auto capillary changer 58 is constructed by a robot arm or an X-Y-Z stage and is movable freely between an electro-spraying part and a multi-capillary cassette hanger 59. Thus the changer 58 can exchange the multi-capillary cassettes. Sample solutions may be supplied into capillaries by means of a filler equipped in at hanger 59 or may be sucked into capillaries from a sample pallet 60 provided separately by means of an automatic sampler.

In the multi-capillary system, although relative positions of respective capillaries and corresponding masks and substrates are different, if a distance between the capillary and the mask or substrate is long enough, particles would be diffused uniformly and are deposited uniformly at deposition areas on respective substrates. In a modified embodiment, the capillaries are successively indexed at a center of the electro-spraying part each time respective solutions are sprayed. Like as the single capillary system, also in the multi-capillary system there may be arranged the driving means for moving the capillary upon the electro-spraying (not shown in FIG. 2).

A mask structure 40 shown in FIG. 3 has function for converging particles sprayed from the capillary and directing said particles to each of spots to form desired size spots on desired respective locations. The mask 40 is applicable commonly to both the single capillary system and the multi-capillary system. The mask 40 is formed by laminating an insulating layer 41, an electrically conductive layer 42, an insulating layer 43 and a mask layer 44 (insulating material layer) in this sequence viewed from the capillary. At an early stage of the electro-spraying, the insulating layer 41 is charged by deposition of charged particles. However, after that, charged particles are prevented from being deposited on mask layer and the insulating layer 41 serves to converge the sprayed substances toward minute holes formed in the mask 40. To this end, the mask structure 40 is designed such that a diameter of an opening of a hole facing the electro-spraying means has a longer diameter than that of an opening of the hole facing the sample chips (on a side of the substrate supporting part). The electrically conductive layer 42 constituting the collimating ring is made of an electrically conductive material such as metal. The conductive layer 42 generates a electric field which repels the charged particles and collects the particles toward centers of the minute holes by applying a medium voltage so that capturing efficiency is improved. The insulating layer 43 has a function for insulating the collimating ring from a mask layer 44 mentioned below.

The mask layer 44 is formed by a thin layer (for example range from ten μm to several hundred μm) of an insulating or dielectric material such as mica and silica glass. The mask layer 44 has a number of perforated holes **44*a* (pore size in a range of a few μm to one hundred μm) whose size (i.e. diameter) is almost same as that of a desired spot. It is considered that the mask layer has a similar function to that of the insulating layers 41 and 43. That is to say, after the mask layer have been charged by the deposition of charged particles, charged particles are directed to center of the hole by electrostatic repelling force. A spacer 45 made of an insulating material such as plastics and glass or a metal and has a thickness of approximately several μm to several tens μm. The spacer 45 is provided for making a space between the mask structure and the sample chips (i.e. the sample holder) to avoid mechanically contacting. The mask structure 40** has several tens to several ten thousands mask holes. By using such mask structure, a great large number of sample chips can be manufactured simultaneously.

In general, sample chips whose number is equal to that of the holes of the mask structure are set and a plurality of chips are manufactured simultaneously in one task. The sample chip is made of optical glass coated with an electrically conductive material (such as ITO (Indium Tin Oxide or a metal film etc.)), a metal plate, soda glass or electrically conductive plastics. It should be noted that although plastic materials are considered to be electrically insulating, they have a slight conductivity, in general, and therefore plastic materials may be used as a substrate without applying an electrically conductive coating. Thus in a practical sense materials which are not suited for the sample chip is limited to fluorocarbon resin, silica glass and so on. An electrically conductive part of the chip is grounded through, for instance, the sample holder in order to remove an electrostatic charge generated by charged particles deposited on the chips. In the present embodiment, the chips are shifted to adjust deposition sites of particles. Instead of moving the chips, the mask may be moved to adjust the deposition locations. Also, instead of moving the mask, deposition sites on chips may be shifted by forming a substrate by a transparent glass coated with a photo-conductive layer and by irradiating light from beneath of the glass chips. It should be noted that a chip size, the number of the chips and so on may can be varied in various ways. For example, the following arrangement may be used in this embodiment:

chip size; 10 mm by 10 mm the number of chips manufactured in one time; from one hundred (10×10) to several thousands (33×33), the number of spots: from 1,000 to 100,000, spot size; circular shape having a diameter of about 10–50 μm spot pitch; from 20 μm to 100 μm.

It is easy to enlarge a spot size, but in this case a chip size has to be increased or the number of spots has to be reduced. According to the invention, sample substances are, in general, proteins such as enzyme, refined receptor, monoclonal antibody, fragment of antibody. Also, DNA and its fragment, cDNA and its fragment, various kinds of organic macromolecule compounds, and minute particles such as membrane integral receptor and virus may be also used as sample substances.

In the present embodiment, since the mask with 100 holes is utilized, 100 (10 by 10) chips (microarrays) are set on the sample holder. A multi-capillary cassette with 96 wells is used as a capillary storage, and each capillaries have different sample solutions. Now it is assumed that 10,000 spots are to be formed in total, 105 units of multi-capillary cassettes each having 96 wells and 1,000 kinds of sample solutions have to be prepared. Each of these solutions is infused into each of the capillaries. A square plate of 10 mm by 10 mm is used as a sample chip and spots having a diameter of 20 μm are to be deposited with a pitch of 80 μm. In this manner, 10,000 spots can be formed on a single chip. A deposition time of about 10 seconds is required to form one spot, and therefore it takes 28 hours to form 10,000 spots. In this embodiment, since 100 units of chips can be manufactured simultaneously, 100 units of chips each having 10,000 spots can be manufactured simultaneously in 28 hours.

The mask structure is designed to be manufactured easily in the following manner:

(1) A metal layer (aluminum, copper, etc.) and an insulating layer are successively provided on an insulating plate (PMMA, fluororesin, etc.).

(2) The thus laminated plate is drilled from above using a tool such as end mill and a number of conical holes are formed.

(3) A number of minute holes are formed in a plate made of mica or silica glass, etc. using abrasive jets, etching or microscopic machining or the like, then this plate is built-up on the laminated plate formed in the process (2).

(4) Finally the spacers are adhered on a bottom surface of the laminated plate. In this manner the mask structure is attained.

Figure 1:
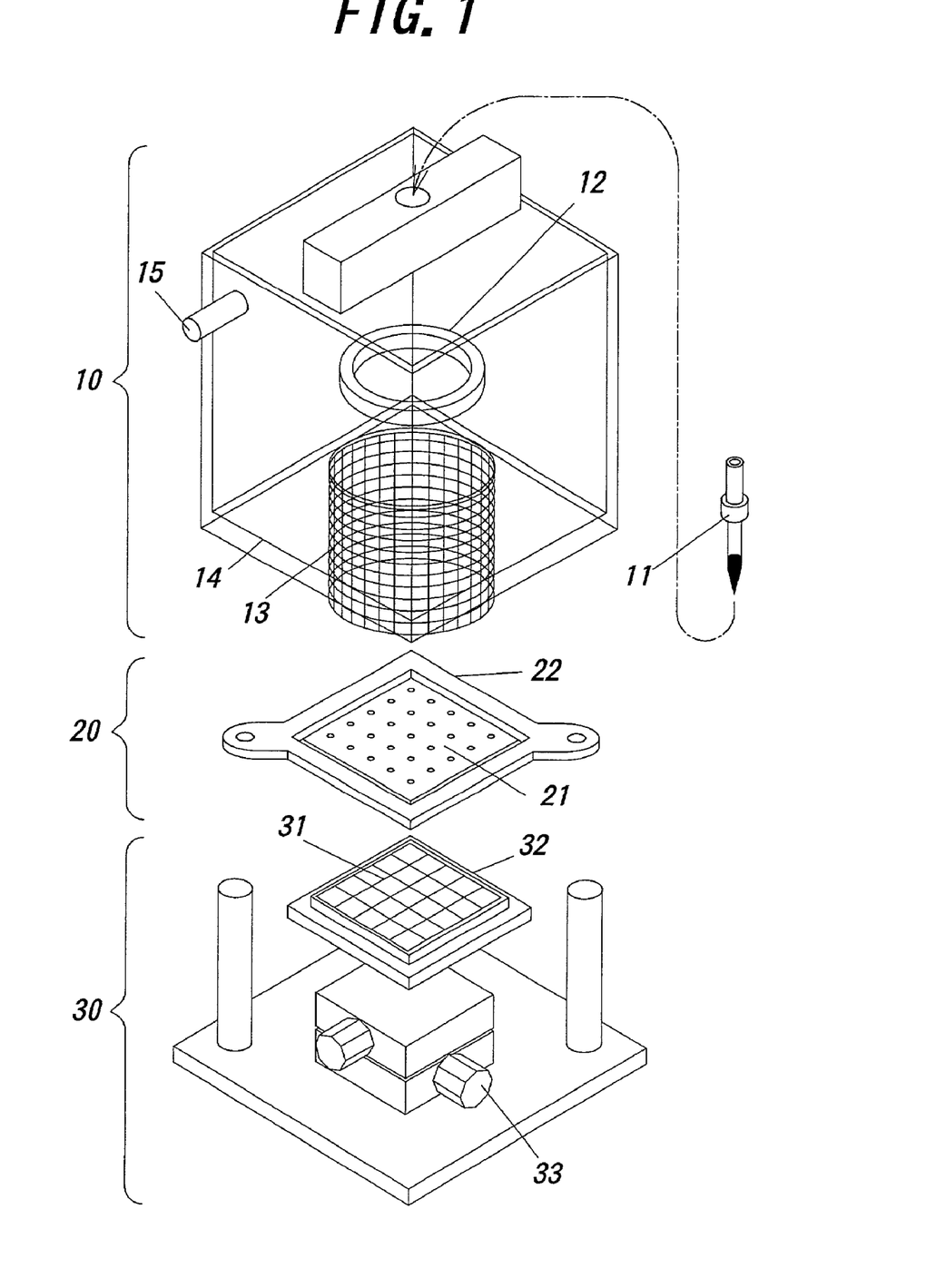
FIG. 1 is a perspective view illustrating the arrangement of the single capillary system according to the invention.
Figure 2:
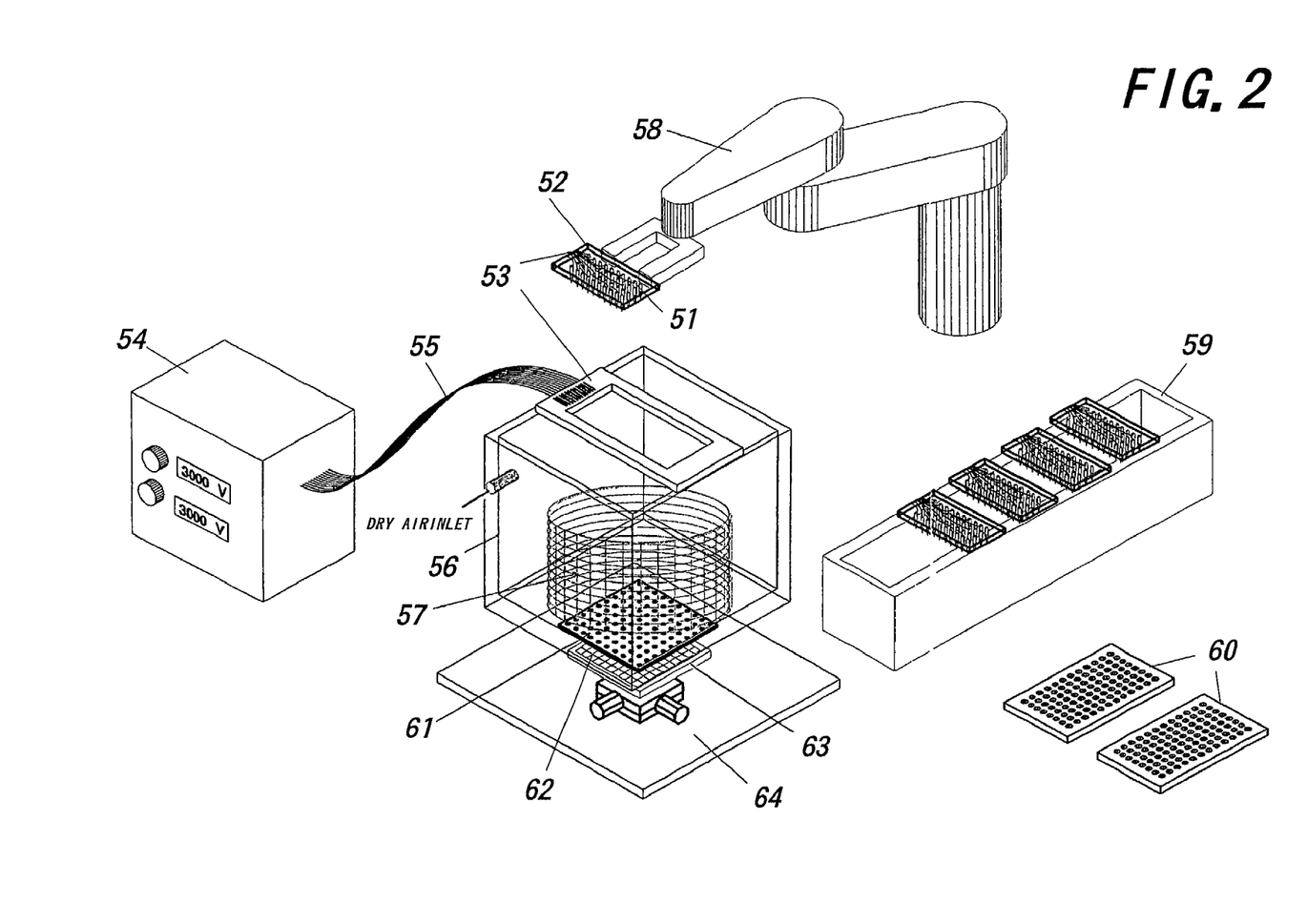
FIG. 2 is a perspective view depicting the arrangement of the multi-capillary system according to the invention.
Figure 3:
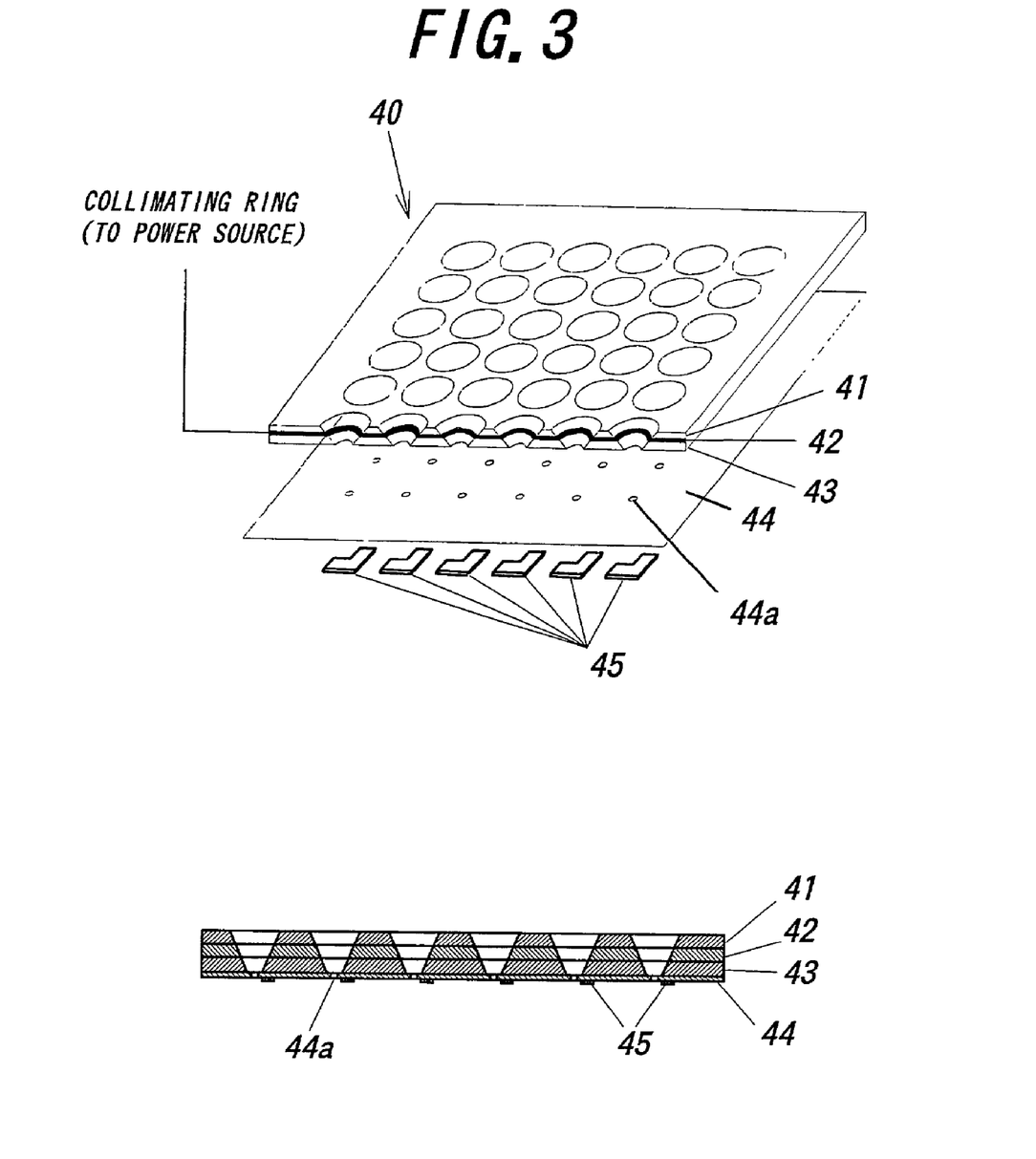
FIG. 3 is a cross section diagram and an exploded perspective view of a mask.
Figure 4:
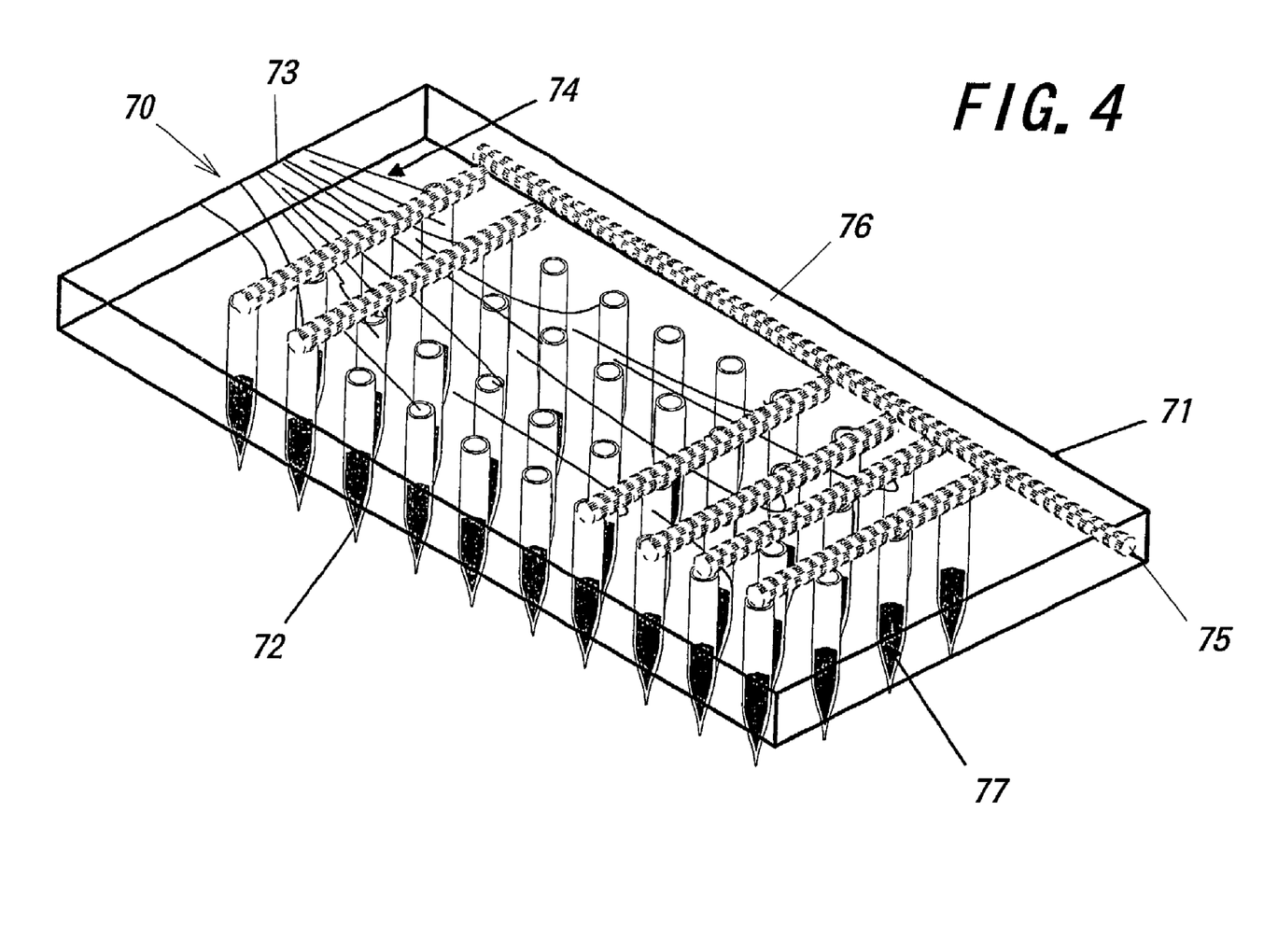
FIG. 4 is a perspective diagram illustrating the structure of the multi-capillary cassette.

As shown in FIG. 4, a multi-capillary cassette 70 includes a capillary support base 71 (made of plastics such as PMMA, etc.), and a plurality of capillaries 72 are mounted on the base 71. Each of the capillaries 72 has an electrode (not shown) and each of the electrode is connected with an electric connector 73 via a wiring pattern 74. These capillaries 72 contain different kinds of sample solutions. The multi-capillary cassette further comprises a pressurized air inlet 75 and conduit channels 76. Upon electro-spraying, it is possible to pressurize the sample solutions contained within the capillaries, and when the inlet is coupled with a suction device, it is possible to suck in the solutions within the capillaries. In the present embodiment, the application of pressure and reduced pressure is carried out for all the capillaries simultaneously. By applying the pressure, a sample solution is fed to a tip of capillary to make a condition that the electro-spraying could be performed easily. This application of pressure is not essential and is secondarily used for making a condition that the spraying is performed easily. In this manner, under the situation that the sample solutions are fed to tips of all capillaries, a high voltage is applied to one of the capillaries, and then a sample solution contained in this capillary is sprayed by the electrostatic force to forms a number of minute droplets. Of course, it is also possible to apply the pressure only to a selected one capillary and a high voltage is applied to this selected capillary. Usually the multi-capillary cassette 70 is disposable and there is no need for washing. The multi-capillary cassette may be also reused by washing. A number of sample solutions are simultaneously sucked into capillaries from the sample palette, as shown in FIG. 2. Alternatively, capillaries having sample solutions previously contained therein may be mounted on the base.

Figure 5:
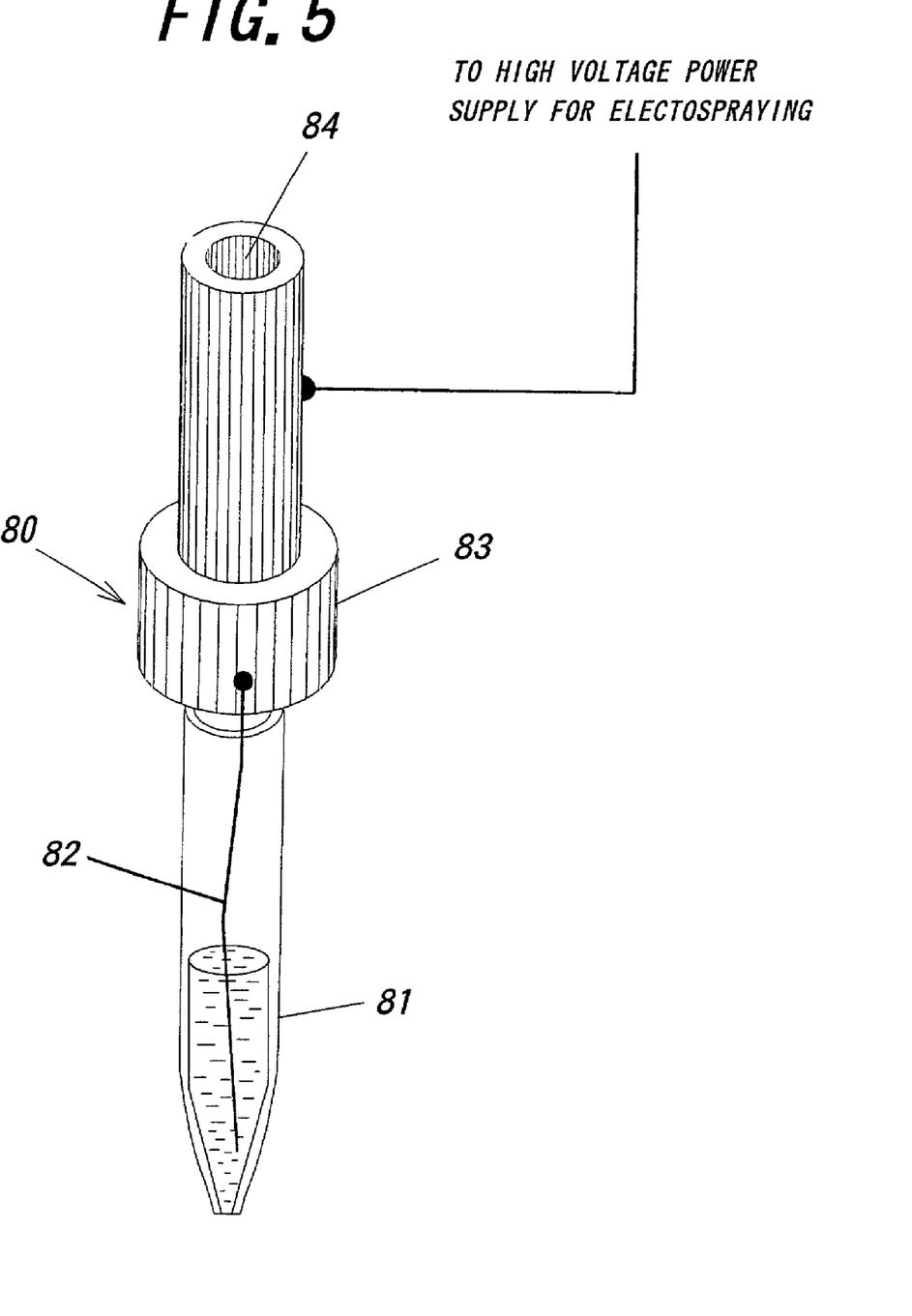
FIG. 5 is a perspective diagram showing the structure of the single capillary system.

FIG. 5 shows a single capillary 80, which comprises a capillary 81 (about one to several mm in diameter) with a narrow tip (about a few μm to several tens μm in diameter) made of glass or plastics, etc., an electrically conductive wire 82 (made of platinum, etc.) as a electrode and a capillary holder 83. The capillary 81 contains a sample solution. The capillary holder 83 is connected with the high voltage power supply through the conductive wire 82. At a top of the capillary holder 83 there is provided an inlet 84 for introducing the pressurized air which assists the electro-spraying or the reduced pressure to suck a sample solution from a tip of the capillary. Since different kinds of sample solutions are used, capillaries are exchanged for respective kinds of solutions, alternatively a single capillary can be reused by sucking and discharging a pure water. However, since the screening experiment allows slight contamination, the capillary exchange and the capillary cleaning are not necessary.

Figure 6:
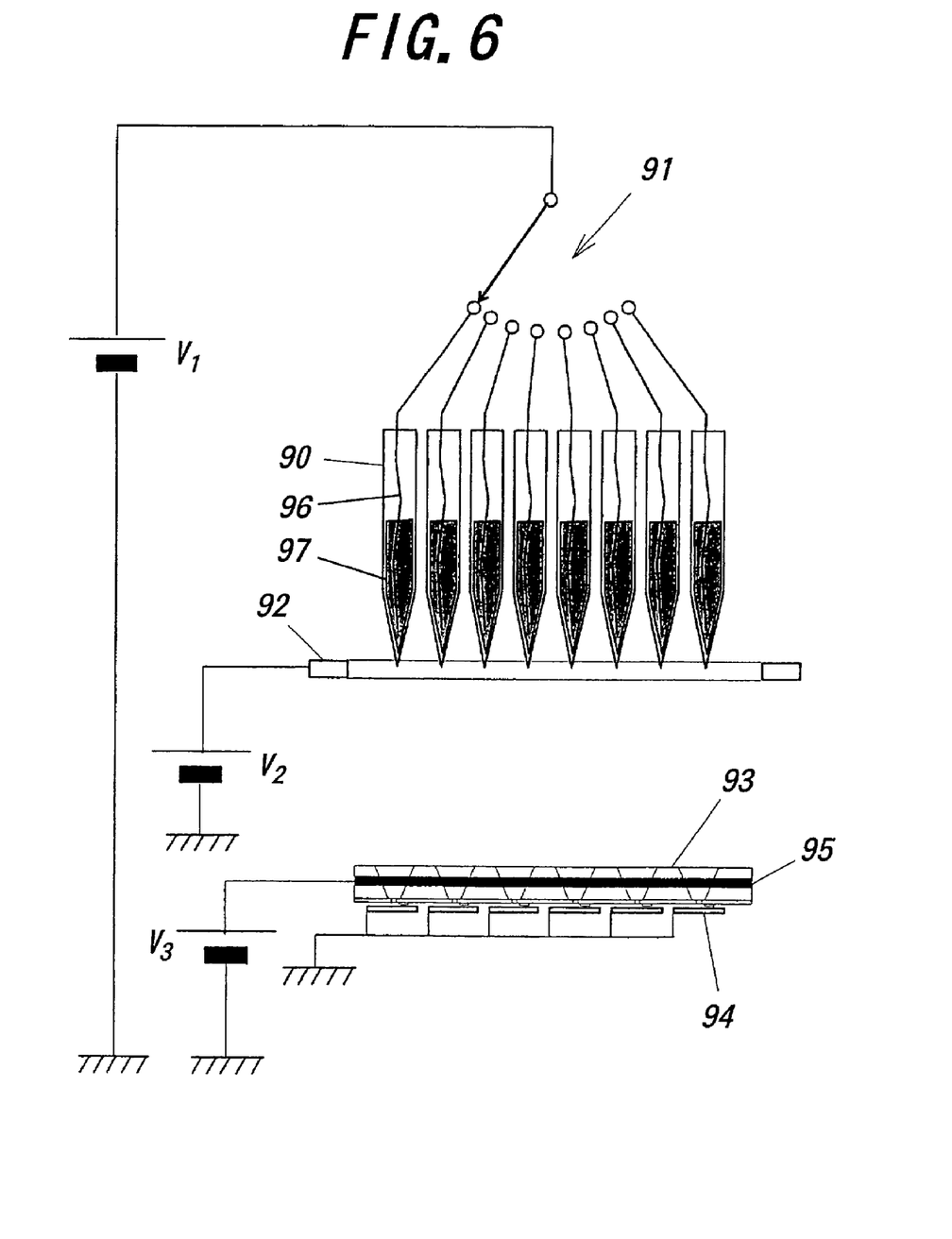
FIG. 6 is an electrical circuit diagram depicting the multi-capillary system.

FIG. 6 illustrates an electrical connection of the multi-capillary system. In the multi-capillary system, there are provided a plurality of capillaries 90, a high voltage switch 91 (provided within the electric equipment), high voltage power supplies V1, V2 and V3, a guard ring 92, a mask structure 93 and a substrate supporting part in which a number of sample chips 94 are arranged. The sample chip 94 is coated with an electrically conductive material or is made of an electrically conductive material, and its conductive part is connected to 0 V (ground potential). The mask structure 93 is located just above the sample chips 94. A guard ring electrode 95 is connected with the collimating voltage power source V3. The guard ring 92 is connected with the voltage power source V2. The electro-spraying voltage power source V1 is connected to a capillary 90 via the high voltage switch 91. These voltages are generally set to V1=2,000–5,000 volt., V2=2,000–5,000 volt. and V3=500–3,000 volt., and have relationship of V1·V2>V3. In accordance with the switching of the high voltage, the mask structure 93 is driven by an X-Y stage (or X-Y-Z stage) to form sample spots with desired size at desired locations. By repeating this operation, a plurality of the chips having a desired large number of spots with desired size can be manufactured simultaneously.

Figure 7:
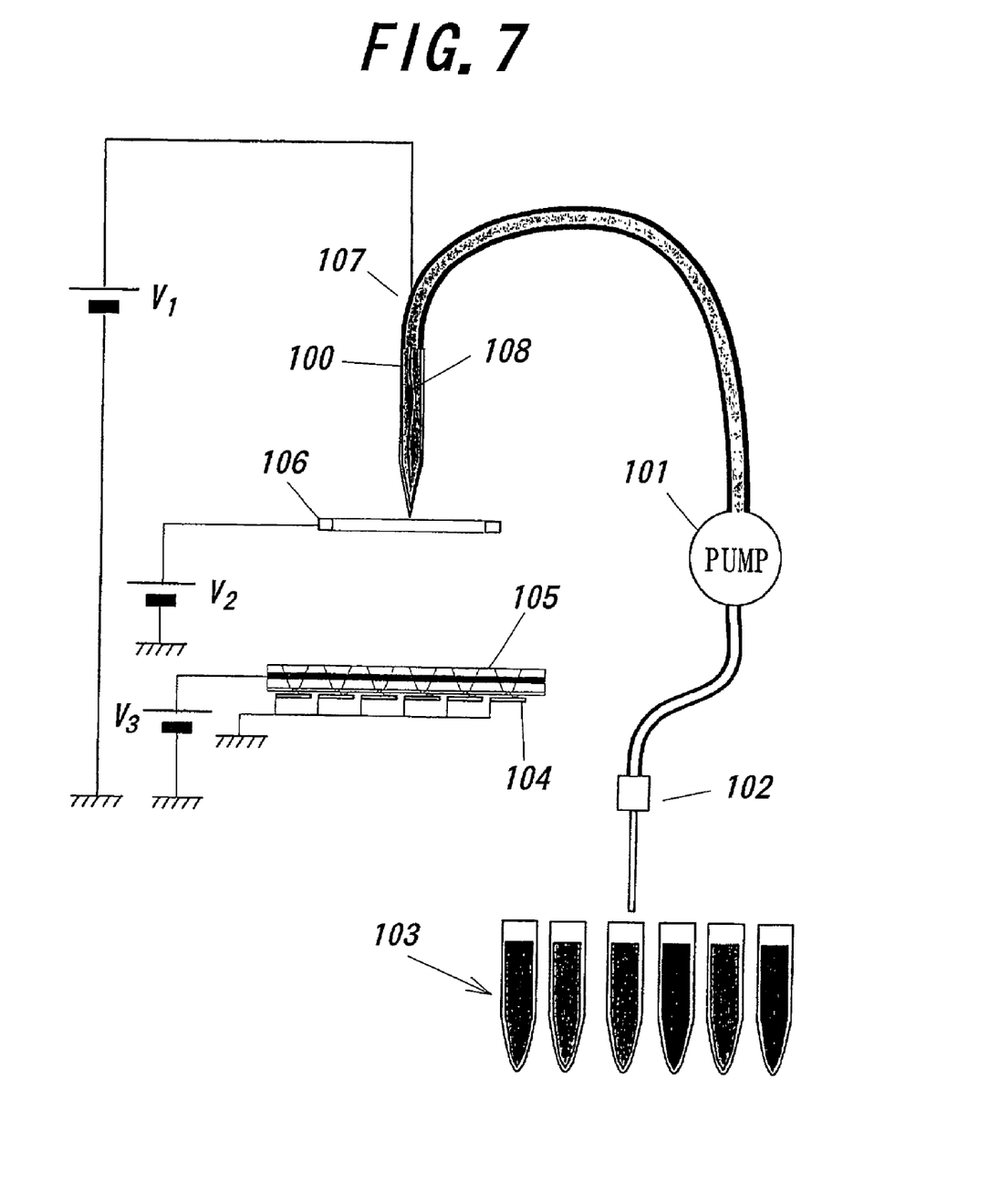
FIG. 7 is a schematic diagram showing the electrical wiring and pipe layout.

FIG. 7 is a schematic diagram showing the electrical wiring and conduit layout of the single capillary system. While said multi-capillary system has a plurality of the capillaries, the single capillary system has only one capillary 100. Various kinds of sample solutions are successively fed into the single capillary 100 to form microarrays. The single capillary 100 is coupled with a pump 101 and a sampler 102 for sucking the sample solutions 103. In this manner, the sample solutions such as cDNA and protein can be successively fed into the capillary 100. It should be noted that since a diameter of a conduit tube 107 is sufficiently small, sucked sample solutions are banked as respective layers within the tube and can be prevented from being mixed with each other. In order to manufacture microarrays, the sample chips 104 or the mask 105 is shifted using the X-Y (or X-Y-Z) stage every time sample solutions are electrostatically sprayed such that sprayed particles are deposited at desired positions to form sample spots. In case of the screening experiment, slight contamination is no problem, and therefore, sample solutions can be sucked into capillaries without washing or exchanging capillary. Alternatively, a pure water may be sucked into the capillary between successively sucked sample solutions, and after spraying a sample solution, a pure water is sprayed to clean inner walls of the capillary and conduit pipe. In this case, the pure water used for cleaning may be discharged by a pressurized air, and then the discharged water is easily vaporized. Thus, in general, it is unnecessary to provide any means for collecting the water.

Figure 8:
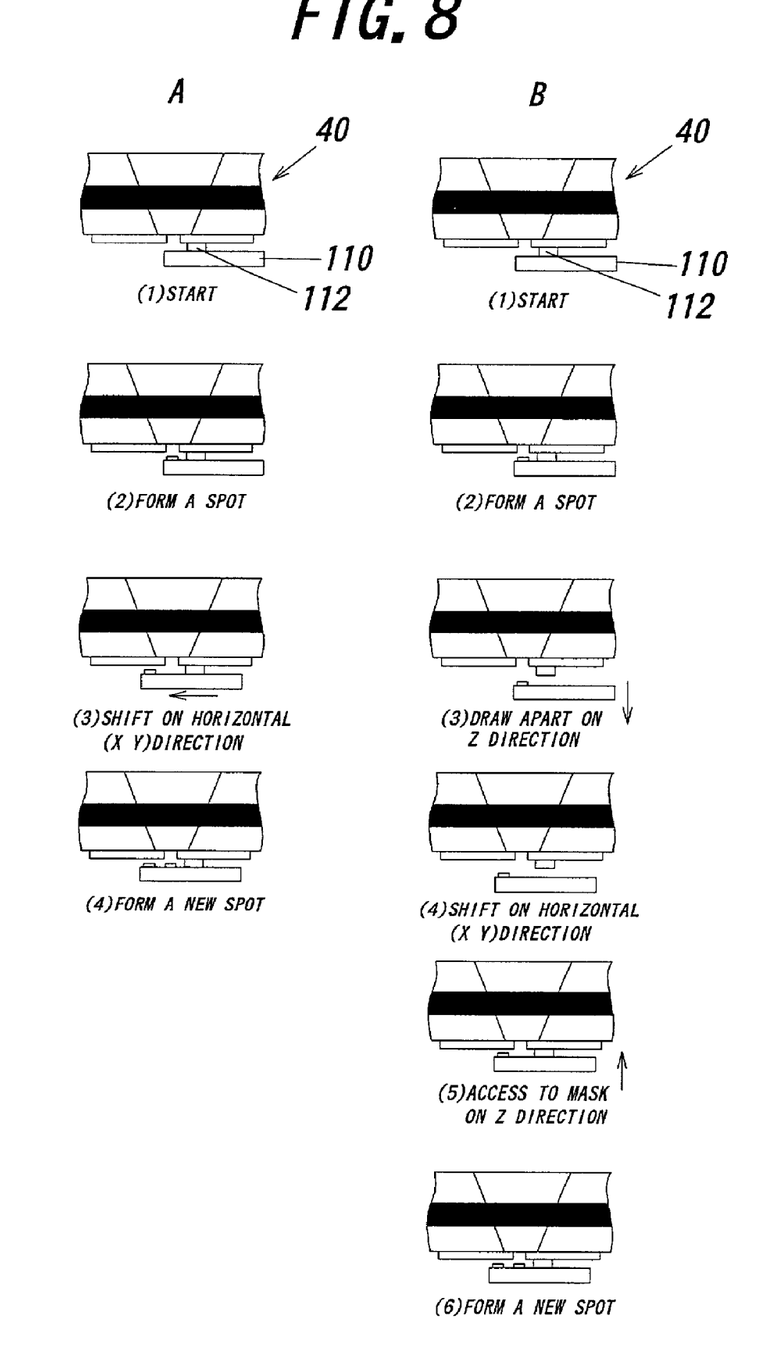
FIG. 8 is a schematic diagram illustrating the driving mechanism during the manufacture of the microarrays and X-Y system and X-Y-Z system.

FIG. 8 is a schematic diagram illustrating the driving method of the X-Y stage or X-Y-Z stage during the formation of microarrays. That is, FIG. 8 shows relative positions between the mask structure and the sample chips during the formation of sample spots. As described above, the spacers are mounted on the bottom surface of the mask structure for keeping an appropriate distance between the mask structure and the sample chips to avoid undesired mechanical contact of the mask with deposited spots of cDNA or protein and prevent contamination or damage. Therefore, the spacers contact with surfaces of the sample chips during the electro-spraying. A thickness of the spacer is determined by height of a spot to be formed. The spacer is designed to have suitable configuration and dimension such that the spacer does not interfere previously deposited sample spots. There are two driving methods; in the first method (FIG. 8A), the sample chips are moved only on the X-Y plane, and in the second method (FIG. 8B), the sample chips are moved on the X-Y plane as well as in the Z-direction (a direction perpendicular to the mask). The first method is applicable if surfaces of the sample chips and spacers are made of materials having a relatively good abrasion proof. Since it does not require the control in the Z direction, the stage has a simpler structure. The second method is preferable for a case, in which surfaces of the sample chip and/or the spacers might be damaged by the movement of the spacers.

The driving method on the X-Y plane (FIG. 8A) is as follows:
(1) In the beginning, the mask structure is located at a predetermined position on the sample chips.
(2) Spots are formed on the sample chips by the electro-spraying.
(3) The sample chips are moved on the X-Y plane by driving the X-Y stage which holds the sample chips, such that next spotting positions of the chips are indexed.
(4) Spots are formed on the thus indexed spotting positions by the electro-spraying.
(5) A necessary quantity of sample spots are formed by repeating the steps (3) and (4).

The second driving method in the X-Y-Z directions (FIG. 8B) is as follows:
(1) In the beginning, the mask structure is located at a predetermined position on the sample chips.
(2) Sample spots are formed on the sample chips by the electro-spraying.
(3) The sample chips are removed from the mask structure by driving the Z stage.
(4) The sample chips are moved on the X-Y plane by driving the X-Y stage such that next spotting positions are indexed.
(5) The sample chips are contacted again with the mask structure by driving the Z stage.
(6) Sample spots are formed on the sample chips by the electro-spraying.
(7) A necessary quantity of sample spots are formed by repeating the steps (3) and (4).

In the present embodiment, the sample chips are mounted on the X-Y stage or the X-Y-Z stage, while the mask is fixed. According to the present invention, it is sufficient to change a relative position between the sample chips and the mask, and therefore either one of the sample chips and the mask structure may be driven in the X axis and Y axis and Z axis.

Figure 9:
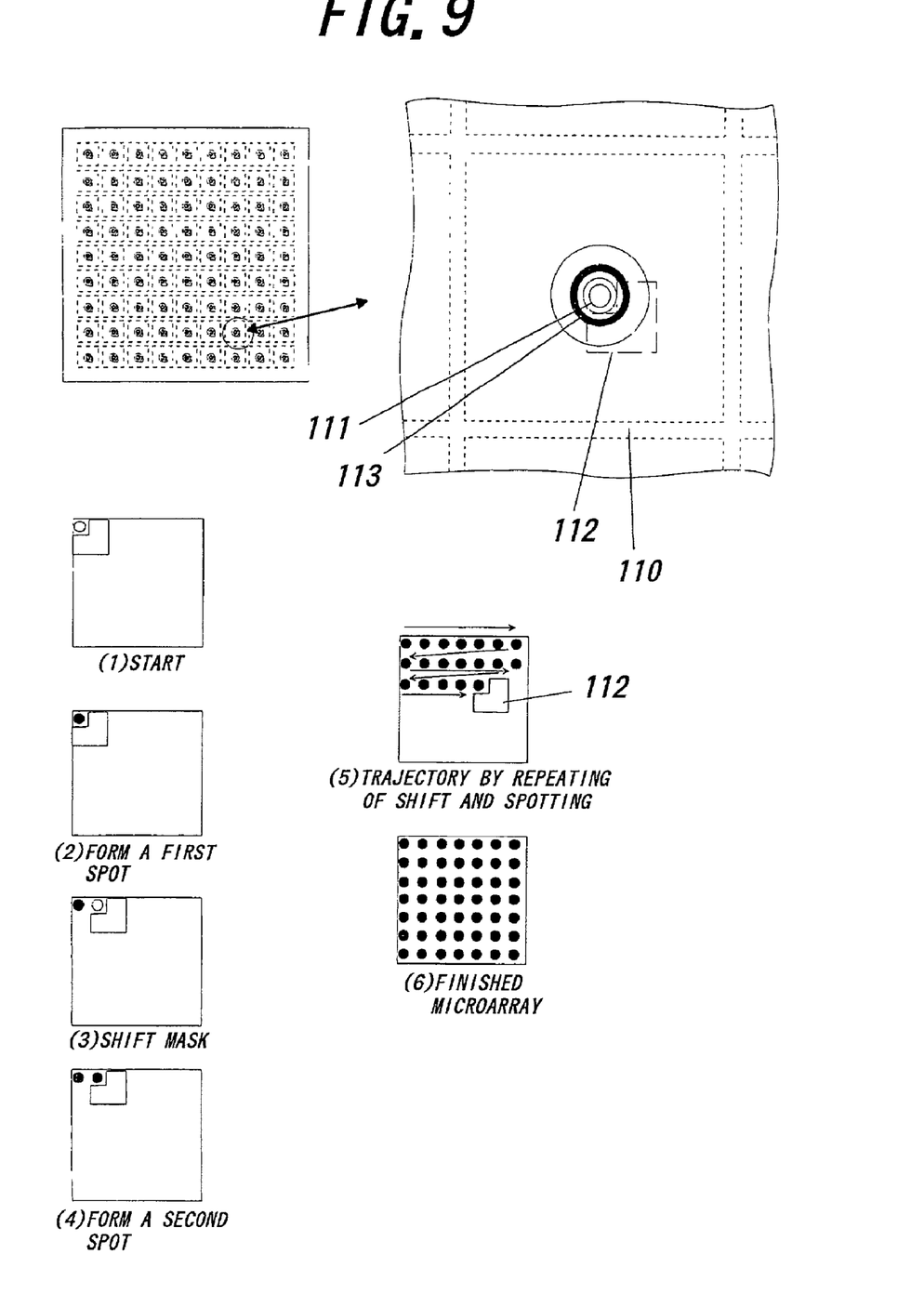
FIG. 9 is a schematic diagram depicting a manner of moving a mask on X-Y plane as well as a sequence of forming a number of spots.

FIG. 9 is a schematic diagram depicting a manner of moving the mask on the X-Y plane and successive steps of forming a number of sample spots. As shown in an upper left part in FIG. 9, the mask has a number of minute holes viewed from above, and sample chips 110 are disposed below the mask. One of the chips 110 is shown in an enlarged scale, a spacer 112 is mounted on a bottom surface of a portion of the mask structure having a minute hole 111. The movement in the vertical direction (i.e. Z direction) has been explained with reference to FIG. 8. In order to avoid contamination and damage of the already deposited sample spots, the relative movement of the mask structure and sample chips has to be controlled precisely. In the present embodiment, the mask structure having specially configured spacers 112 shown in FIG. 9 is utilized, and sample spots are formed in the following manner:
(1) The minute hole 111 in the mask is indexed at an upper left corner of a sample chip 110.
(2) A first spot is formed on the sample chip by the electro-spraying.
(3) The mask is sifted to right.
(4) A second spot is formed on the sample chip by the electro-spraying.
(5) A lots of spots are formed on the sample chip by repeating the steps (3) and (4). In this case, the spacer is moved along a trajectory such that previously deposited spots are not brought into contact with the spacer.

As illustrated in FIG. 9, spots are successively disposed on the sample chip from its upper left corner to its upper right corner to form a first row of sample spots. After the spot has been disposed on the upper right corner, the stage is shifted just below the first row, then spots are disposed in sequence from left to right to form a second row of sample spots. In this manner, a number of the sample spots can be formed on the sample chip without contacting the spacer 112 with previously deposited spots. The trajectory of the movement of the spacer and a shape of the spacer are not limited to the above explained example, wide variety of combination are possible.

INDUSTRIAL APPLICABILITY

The advantages of the device according to present invention are summarized as follows:

(1) The device is applicable to separately prepared DNAs, proteins and other compounds.
(2) A great number of the spots can simultaneously be formed in a short period of time, thereby a large number of sample chips can be manufactured simultaneously.
(3) Very minute spots (1–2 μm diameter) can be deposited and sample chips with a high spot density could be manufacture.
(4) The spots can be formed using only small amounts of sample solutions.
(5) As the result of the above mentioned merits, cost of the chips (i.e. microarrays) as an end product may be reduced notably lower than that of conventional chips.

As described above, since the present invention is applicable to various substances such as DNAs and proteins, the present invention is suitable for various applications as follows:

(1) Analysis of genes (gene expression monitoring, gene sequencing, etc.)
(2) Analysis of functions of proteins
(3) Diagnostic products (gene diagnosis, typing of an enzyme, determination of allergen, identification or typing of infection fungus, etc.)
(4) Curing diseases (determination of drugs best fit for respective conditions of genetic strains or physiological characteristics of patients, etc.)
(5) Screenings of drugs and the like (multi-factor high-throughput screening is possible)
(6) Analyses (analysis of toxicity of compound, environment, contamination of microbe of foods, or etc.)

In addition to the above listed applications, it is expected that a much more wider variety of applications will be found in the future.

What is claimed is:

1. A device for manufacturing microarrays comprising:
   electro-spraying means for electrostatically spraying, in sequence, a plurality of solutions each containing respective one of a plurality of kinds of biologically active samples;
   supporting means for supporting a plurality of sample chips on which samples contained in the solutions and electrostatically sprayed from said electro-spraying means are deposited;
   masking means disposed between said electro-spraying means and said supporting means and having holes whose number is equal to the number of the sample chips, a sample being selectively and simultaneously deposited on said sample chips at predetermined corresponding locations, wherein the masking means is formed by sequentially laminating a first insulating layer, an electrically conductive layer, a second insulating layer and a mask layer; and
   shifting means for shifting said supporting means and said masking means relatively such that the samples are deposited on said plurality of sample chips to manufacture simultaneously a plurality of microarrays.

2. The device according to claim 1, wherein said electro-spraying means comprises:
   a single capillary including one or more electrodes; and
   means for successively feeding to said capillary said plurality of solutions each containing respective one of said plurality of biologically active samples.

3. The device according to claim 2, wherein the device further comprises means for cleaning said capillary after a sample solution has been electrostatically sprayed and before a next sample solution is electrostatically sprayed.

4. The device according to claim 2, wherein said electro-spraying means further comprises means for feeding a pressurized air into the capillary to convey the solution to tip of the capillary when the solution is to be electrostatically sprayed.

5. The device according to claim 2, wherein said electro-spraying means further comprises a guard ring and/or a shield for preventing diffusion of the electrostatically sprayed substances from said capillary.

6. The device according to claim 2, wherein the device further comprises means for shifting relative position between said capillary and said supporting means and masking means such that the samples are deposited on each of said plurality of sample chips and a plurality of microarrays are manufactured simultaneously.

7. The device according to claim 1, wherein said electro-spraying means further comprises:
   means for holding a plurality of multi-capillary cassettes each including a plurality of capillaries each containing respective one of said plurality of sample solutions and having one or more electrodes which are selectively connected with a power source for electro-spraying; and
   transporting means for successively transporting said plurality of multi-capillary cassettes to an electro-spraying site.

8. The device according to claim 7, wherein said electro-spraying means further comprises means for applying a pressurized air to all the capillaries in said multi-capillary cassette to convey the sample solutions to tips of capillaries when the solutions are to be electrostatically sprayed.

9. The device according to claim 7, wherein said holding means further comprises means for controlling a temperature of the plurality of sample solutions contained in said capillaries held in the multi-capillary cassette.

10. The device according to claim 7, wherein said electro-spraying means further comprises a guard ring and/or a shield for preventing diffusion of the electrostatically prayed substances from said capillaries provided in the multi-capillary cassette.

11. The device according to claim 7, wherein the device further comprises means for shifting relative position between said multi-capillary cassette and said supporting means and masking means such that the samples are deposited on each of said plurality of sample chips to manufacture a plurality of microarrays simultaneously.

12. The device according to claim 1, wherein said hole of the masking means is formed such that a size of an opening of the hole facing said electro-spraying means is larger than a size of an opening of the hole facing said holding means.

13. The device according to claim 1, wherein said masking means comprises a collimating ring for collecting electrostatically sprayed particles toward the hole, said collimating ring being formed integrally with the masking means.

14. The device according to claim 1, wherein said shifting means for moving said sample chip supporting means and said masking means relatively comprises an X-Y stage or X-Y-Z stage for shifting said supporting means with respect to said masking means.

15. The device according to claim 1, wherein the device further comprises a plurality of spacers fixed to a surface of said masking means facing to said sample chips at positions near each of the plurality of the holes formed in the masking means.

16. The device according to claim 1, wherein the device further comprises means for feeding a purified dry air through a casing which surrounds a electro-spraying site.

17. The device according to claim 1, wherein said sample chips are made of an electrically conductive material or an electrically insulating material coated with an electrically conductive material and are connected to the ground potential.

* * * * *